(12) United States Patent
Aritake et al.

(10) Patent No.: US 6,226,926 B1
(45) Date of Patent: May 8, 2001

(54) GLASS RUN

(75) Inventors: Masanori Aritake, Ichinomiya; Hitoshi Omori, Inazawa, both of (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/353,145

(22) Filed: Jul. 14, 1999

(30) Foreign Application Priority Data

Jul. 15, 1998 (JP) .................................................. 10-218583

(51) Int. Cl.[7] .............................. E05D 15/16; B60J 10/08
(52) U.S. Cl. .......................... 49/440; 49/441; 296/146.9
(58) Field of Search .................... 49/440, 441; 296/146.9

(56) References Cited

U.S. PATENT DOCUMENTS

| 4,454,687 | 6/1984 | Baker . | |
|---|---|---|---|
| 4,894,953 | 1/1990 | Nozaki . | |
| 4,897,298 | * 1/1990 | Otawa et al. | 49/441 X |
| 5,265,377 | 11/1993 | Iwasa et al. | 49/441 |
| 5,694,718 | * 12/1997 | Norton | 49/440 |

FOREIGN PATENT DOCUMENTS

| 0 256 219 | 2/1988 | (EP) . |
|---|---|---|
| 0 860 314 A1 | 8/1998 | (EP) . |
| 0 900 680 A1 | 3/1999 | (EP) . |

* cited by examiner

Primary Examiner—Daniel P. Stodola
Assistant Examiner—Hugh B. Thompson
(74) Attorney, Agent, or Firm—Pillsbury Winthrop LLP

(57) ABSTRACT

A glass run comprised of at least one molded part. The molded part comprises a channel portion having a bottom portion, side walls, seal lips projecting from the side walls and one or more gutters provided on the surface of the bottom portion for discharging debris.

11 Claims, 6 Drawing Sheets

GLASS RUN

BACKGROUND OF THE INVENTION

1. Field of the Invention

This invention relates to the formation of a glass run for slidably receiving the peripheral edge of a moving window glass so as to guide the movement of the window glass, for sealing between the window glass and a door sash, and for including an internal debris discharge system.

2. Description of Related Art

A conventional glass run 50 is shown in FIGS. 6 to 8. The glass run 50 is attached to a door sash 1 of an automobile (see FIG. 4) and seals between the outer peripheral edge of a raised (closed) door window glass 2 and the door sash 1. The glass run 50 comprises a plurality of straight extruded parts 51 and curved or bent molded parts 61, each of which connects together two of the straight extruded parts 51. The extruded part 51 is attached to a straight section of the door sash 1 while the molded part 61 is attached to a corner section of the door sash 1. The letter "S" designates aborderline, or the connected end surfaces, between the extruded part 51 and the molded part 61.

The extruded part 51 shown in FIG. 7 comprises a channel portion 54 which consists of a bottom portion 52, two side walls 53, and two seal lips 55 which project into the channel portion 54 from free ends of the both side walls 53. The molded part 61, shown in FIG. 8, comprises a channel portion 64 which consists of a bottom portion 62 having a solid flat interior surface, two side walls 63, and two seal lips 65 which project into the channel portion 64 from free ends of the both side walls 63. The end face of the outer peripheral edge of the door window glass 2 slides on the surfaces of the bottom portions 52,62. Therefore, there is a concern that the surfaces of the bottom portions 52, 62 may be easily abraded. Further, if debris such as sand or dust becomes inserted between the surfaces of the bottom portions 52, 62 and the end face of the window glass 2, abrasion of these surfaces will be accelerated in advance of normal conditions.

To solve the above-mentioned problem, gutters or ditches 57 are formed in the longitudinal direction along the interior of bottom portion 52 of the straight extruded part 51 with small cross sectional areas. Gutters 57 are formed simultaneously when the channel portion 54 and the seal lips 55 are formed by extrusion molding made of an ethylene-propylene-diene copolymer (EPDM) rubber to form the extruded part 51 as a single product, as shown in FIG. 7. With such a structure for the extruded part 51, debris moves and drops into the gutters 57 and is discharged when the window glass 2 slides on the surface of the bottom portion 52.

On the other hand, no gutter arrangement is formed on the interior surface of the bottom portion 62 of the molded part 61, as shown in FIG. 8. Therefore, as for the molded part 61, the above-described operation of discharging debris is not achieved. The reason why no gutter is formed for the molded part 61 is thought to be as follows. Namely, even if gutters having small cross sectional areas are to be formed, it is known that a bleeding mold release agent or process oil, or a generated vulcanization gas easily fills such gutters when the channel portion 64 and the seal lips 65 are molded from an EPDM rubber to form the molded part 61 as a single product. Therefore, no gutter has came to be actually formed.

Also, a molded rubber is inferior to an extruded rubber in durability, even though both are formed from the same type EPDM rubber.

Under those circumstances, there was a problem that the bottom portion 62 of the molded part 61 wore out easier and earlier than the bottom portion 52 of the extruded part 51.

SUMMARY OF THE INVENTION

It is an object of this invention to provide a glass run which can decrease abrasion of the surface of the bottom portion of the molded part, thereby improving its durability.

The present invention resides in a glass run which comprises at least one molded part that includes a channel portion with a bottom portion, side walls, seal lips projecting from the side walls and one or more gutters formed on the surface of the bottom portion for discharging debris.

Here, the molded part is preferably formed from a rubber, a soft resin or a thermoplastic elastomer(TPE). The term "rubber" embraces an ethylene-propylene-diene copolymer (EPDM) rubber and an ethylene-propylene copolymer rubber (EPR). The term "soft resin" embraces an olefin soft resin including a soft polyethylene. The "TPE" embraces an olefin TPE (TPO) and a styrene TPE (SBC). When the molded part is formed from rubber, a mold release agent or process oil, or a vulcanization gas easily fills the gutters for discharging debris. To the contrary, when the molded part is formed from a soft resin or a TPE, there is little mold release agent or process oil present, so that the gutters for discharging debris are hardly filled. Therefore, a soft resin or a TPE is preferable than a rubber.

A gutter for discharging debris may have a V-shaped, U-shaped or rectangular cross section. Though the cross sectional area of such gutters is not specifically limited, gutters designed for a molded part formed from a rubber preferably have a large cross sectional area of the order of 0.15–0.5 mm$^2$ so that the gutters will not be completely filled with mold release agent, process oil or vulcanization gas. The width of the gutter for discharging debris is preferably about 0.4–0.7 mm while the depth thereof is preferably about 0.4–0.7 mm.

Though the direction in which the gutters for discharging debris are formed is not specifically limited, they are preferably provided in the longitudinal direction along the bottom portion. In this case, 1–5 gutters are preferably provided with a pitch between centers of adjacent gutters being about 1–3 mm.

Where grooves, formed in the longitudinal direction along the interior surface of the bottom portion, are provided on both sides of the bottom portion, gutters for discharging debris may be formed in a slantwise direction relative to the longitudinal direction of the bottom portion so they open in such grooves. In this case, the angle at which the gutters slant with respect to the longitudinal direction of the bottom portion is not specifically limited, but an angle from about 45 to about 75 degrees is preferable. Such slantwise positioned gutters are preferably provided with a pitch between centers of adjacent gutters of about 4 to about 6 mm.

Further objects of this invention will become evident upon an understanding of the illustrative embodiments described below. Various advantages not specifically referred to herein but within the scope of the instant invention will occur to one skilled in the art upon practice of the presently disclosed invention. The following examples and embodiments are illustrative and not seen to limit the scope of the invention.

DETAILED DESCRIPTION OF THE PREFERRED EMBODIMENTS

Figure 1:
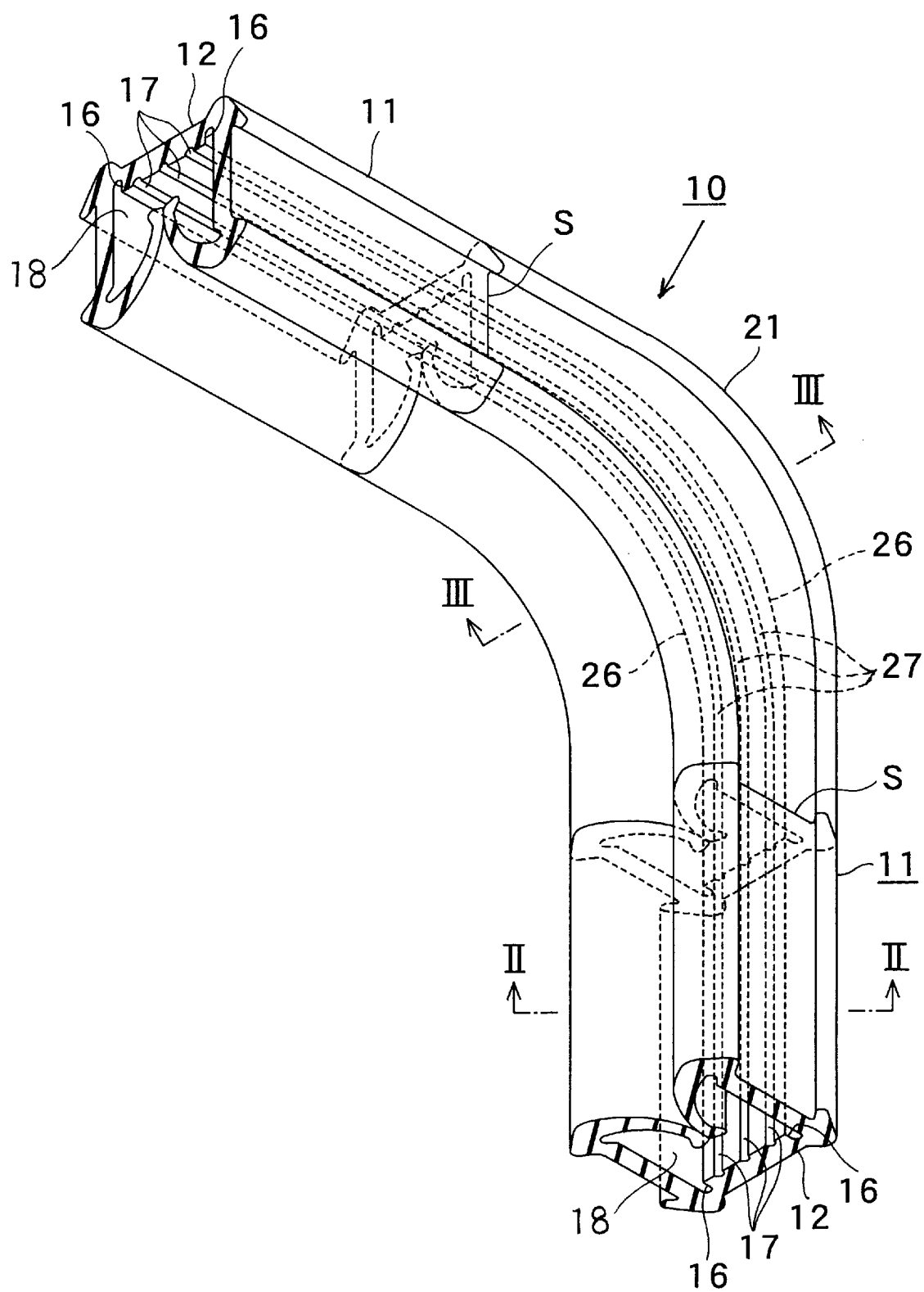
FIG. 1 is a perspective view showing a glass run of the first embodiment of the present invention.
Figure 2:
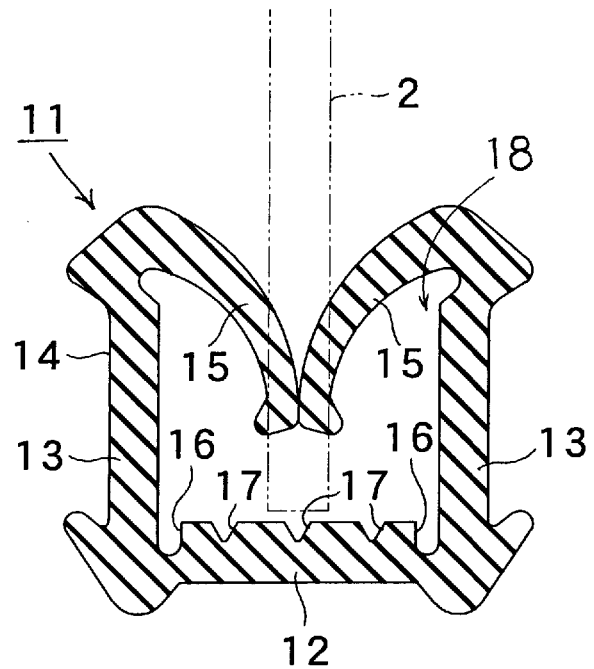
FIG. 2 is a sectional view taken along the line II—II in FIG. 1.
Figure 3:
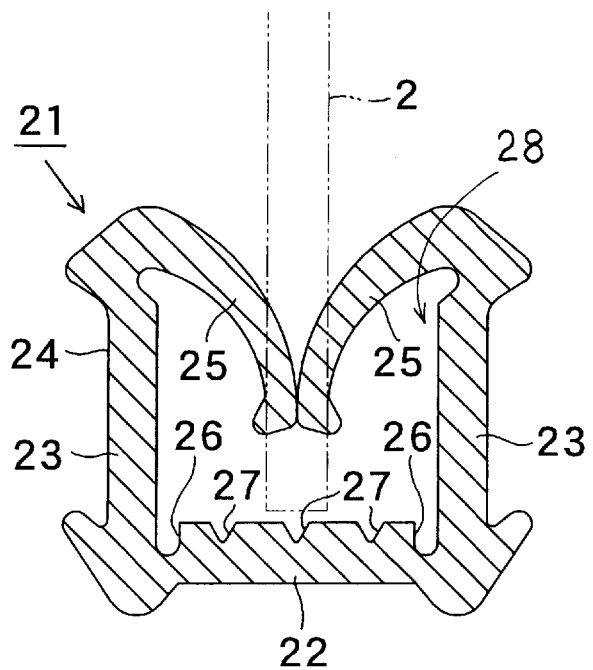
FIG. 3 is a sectional view taken along the line III—III in FIG. 1.
Figure 4:
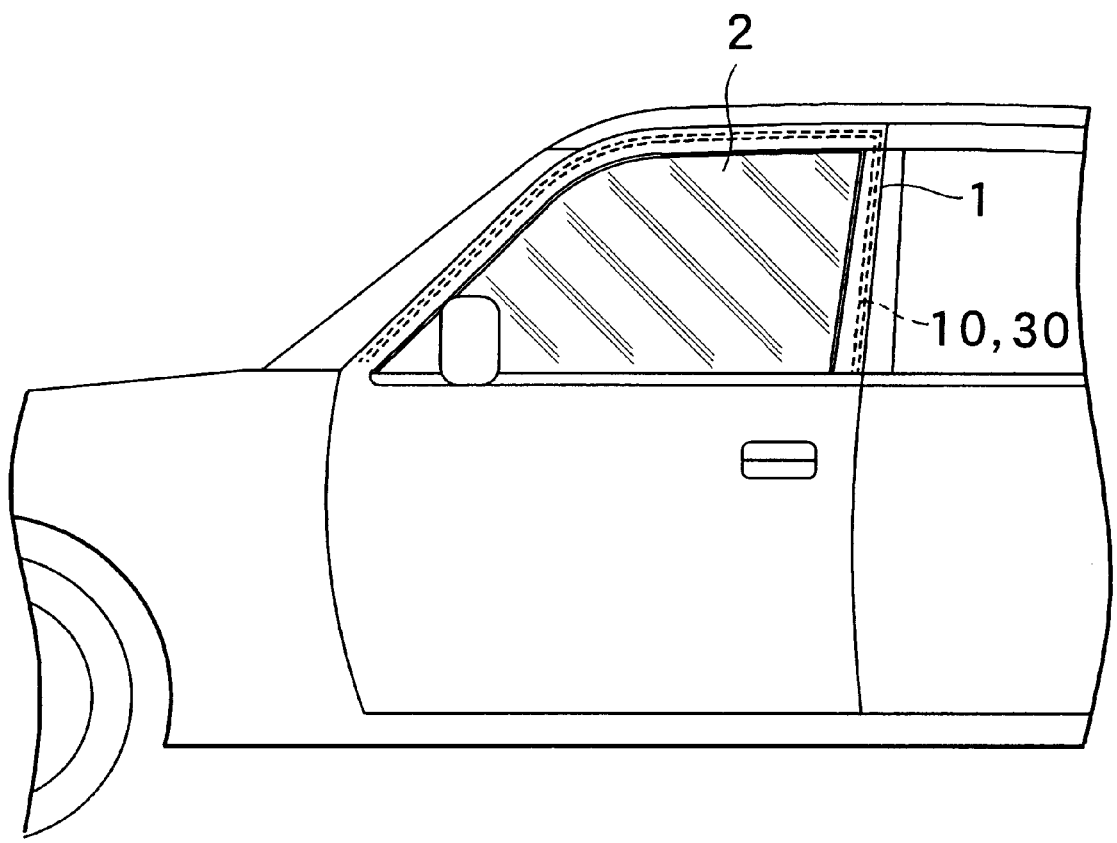
FIG. 4 is a partial side view of an automobile to which the glass run of FIG. 1 is applied.

A glass run 10 of a first embodiment is shown in FIGS. 1 to 3. The glass run 10, attached to a door sash 1 (see FIG. 4), seals between the outer peripheral edge of a raised door window glass 2 and the door sash 1. This glass run 10 comprises a plurality of straight extruded parts 11, portions of which are shown in FIG. 1, and curved or bent molded parts 21 which connect two extruded parts 11. An extruded part 11 is attached to a straight section of the door sash 1, while the curved molded part 21 is attached to follow a corner section of the door sash 1. The letter "S" designates a borderline, or the connected end surfaces, between an extruded part 11 and a molded part 21.

The extruded part 11, the cross section of which is shown in FIG. 2, comprises a channel portion 14 which includes a bottom portion 12, two side walls 13, and two seal lips 15 which project into the interior space 18 of channel portion 14 from the free ends of each side wall 13. The molded part 21 shown in FIG. 3 comprises a channel portion 24 which includes a bottom portion 22, two side walls 23, and two seal lips 25 which project into the interior space 28 of channel portion 24 from the free ends of each side wall 23.

The channel portion 14 and the seal lips 15 are formed by extrusion molding preferably made of a TPO or an EPDM type rubber with the extruded part 11 being formed as a single extruded product. Simultaneously with this extrusion molding, interior grooves 16 are formed longitudinally along back side of the bottom portion 12 with a relatively large cross sectional area. Three gutters 17 are also formed in a longitudinal direction along the interior surface of bottom portion 12 and have small cross sectional areas. Gutters 17 are provided to allow the discharge of debris such as sand or dust. Each gutter 17 has a V-shaped cross section, about 0.5 mm in width, 0.5 mm in depth and 1.5 mm in pitch between the centers of adjacent gutters.

The channel portion 24 and the seal lips 25 are molded from a TPO to form the molded part 21 as a single product. Simultaneously with this molding, interior grooves 26 are formed in the longitudinal direction on both sides of the bottom portion 22 and have large cross sectional areas. Three interior gutters 27 are also formed in the longitudinal direction on the interior surface of the bottom portion 22 and have small cross sectional areas. Gutters 27 are provided to allow the discharge of debris and have the same cross sectional shape, width, depth and pitch between centers of adjacent gutters, as described above for gutters 17. Each end of a gutter 27 corresponds to an end of a similarly positioned gutter 17 and they are in relative communication with each other when parts 11 and 21 are connected together.

The molding process that forms part 21 relative to parts 11 starts with, ends of two extruded parts 11 being first set in a mold (not shown) thereby defining a cavity between those two ends. Then, a predetermined amount of TPO is injected into the mold cavity (an injection molding technique is preferably employed here) to thereby form a molded part 21 with its grooves 26 and gutters 27 for discharging debris. Simultaneously with this molding, end surfaces of the extruded parts 11 are connected to the resulting molded part 21. Since both parts 11, 21 are formed from TPO type material and have high compatibility (adhesivity) to each other, they are firmly connected.

The gutters 17, 27 for discharging debris are formed in the longitudinal direction along the interior surface of bottom portions 12, 22, respectively. Debris such as sand or dust may be collected between the surfaces of bottom portions 12, 22 and the end face of the window glass 2. However, since the gutters 17, 27 are formed along the interior surfaces of the bottom portions 12, 22, the debris will move and drop into the gutters 17, 27 when the window glass 2 slides on the surfaces of the bottom portions 12, 22 with such debris moving along the gutters 17, 27 and be discharged. Considering the direction in which the glass run 10 is attached, the longitudinal direction of the bottom portions 12, 22 often corresponds to the vertical or slantwise up and down direction of the door sash 1. Therefore, the debris gradually falls within the vertical gutters 17, 27 and is discharged. Accordingly, when the end face of the outer peripheral edge of the door window glass 2 slides on the interior surfaces of the bottom portions 12, 22, debris is not deposited between the window end face and such interior surfaces, which decreases abrasion of the bottom portions 12, 22 and improves durability of the same.

Figure 5:
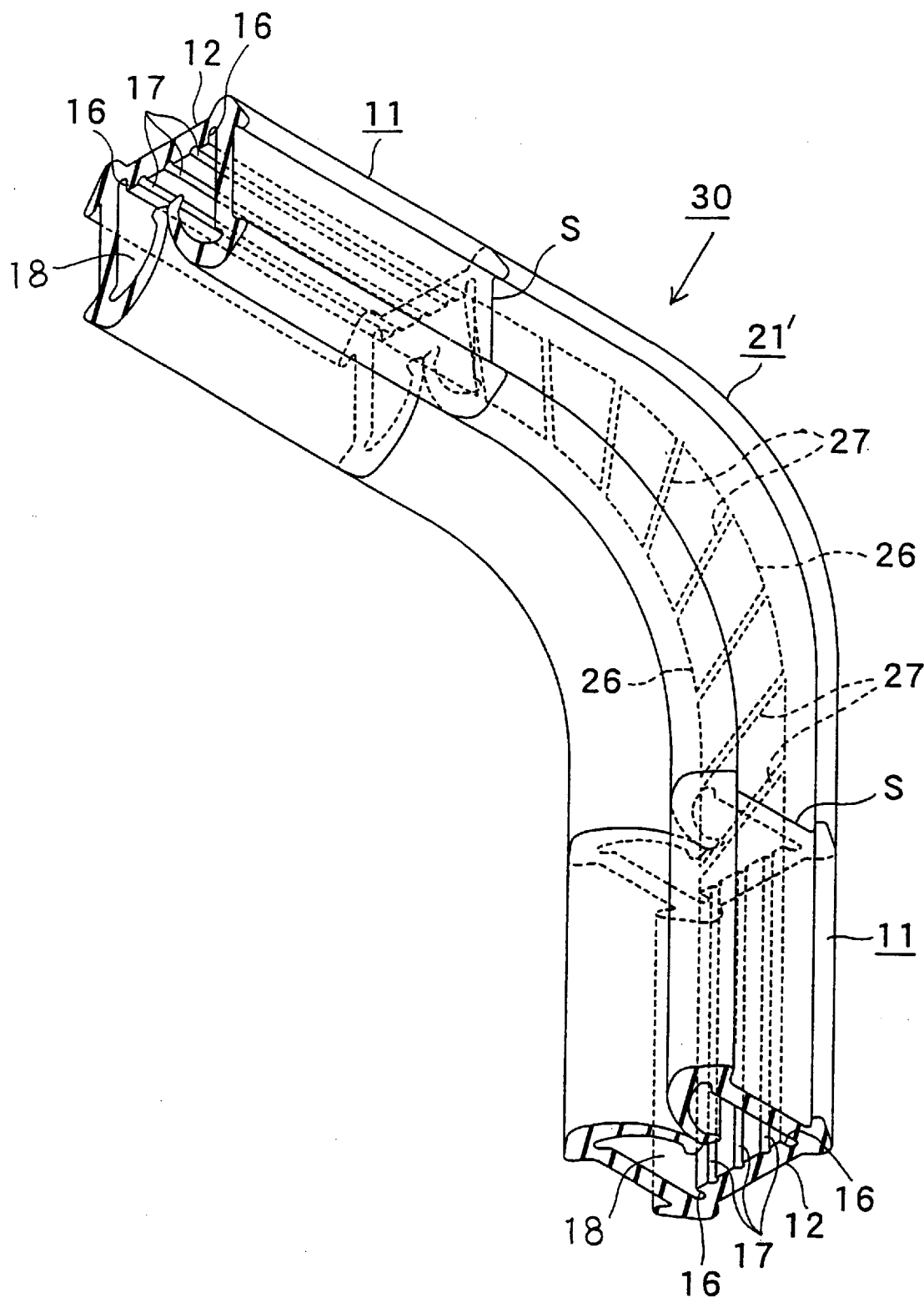
FIG. 5 is a perspective view showing a glass run of the second embodiment of the present invention.
Figure 6:
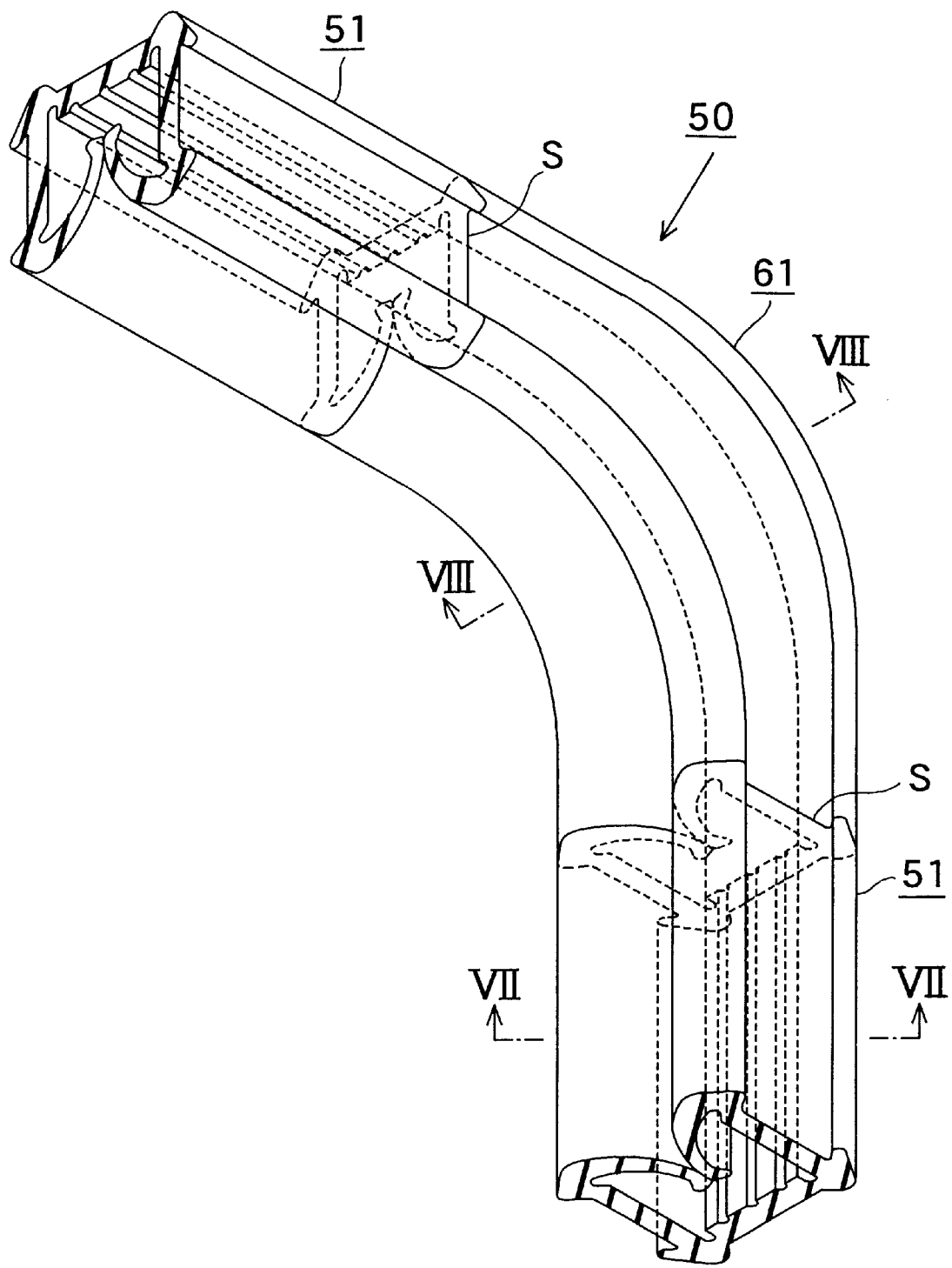
FIG. 6 is a perspective view showing a conventional glass run.
Figure 7:
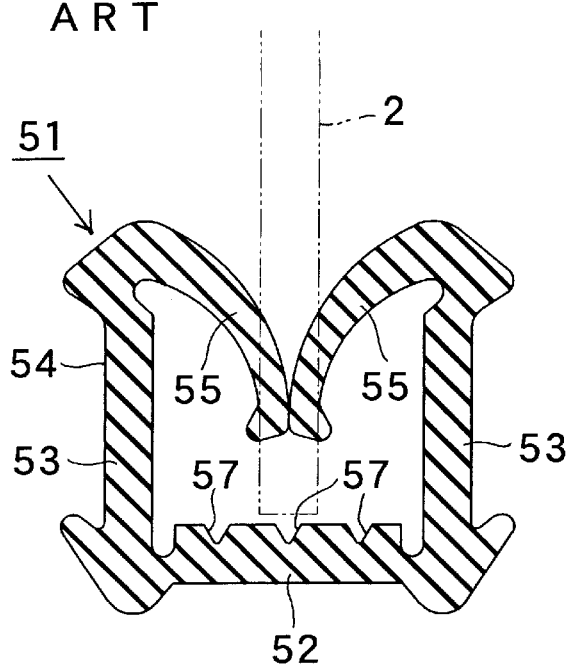
FIG. 7 is a sectional view taken along the line VII—VII in FIG. 6.
Figure 8:
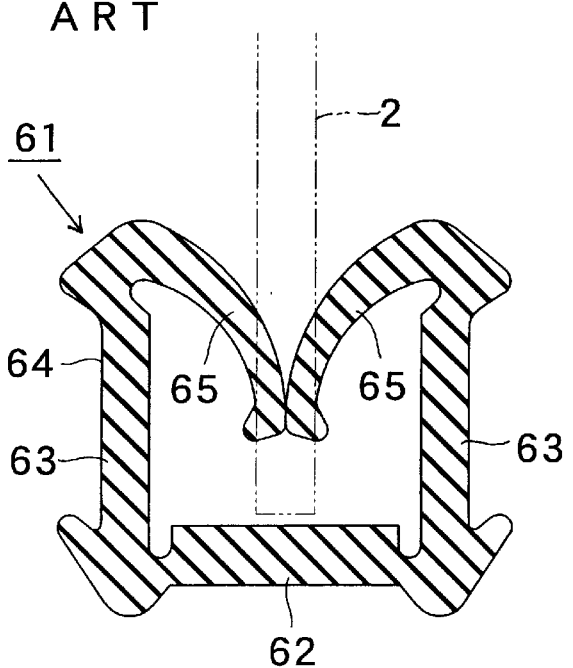
FIG. 8 is a sectional view taken along the line VIII—VIII in FIG. 6.

FIG. 5 shows a glass run 30 of a second embodiment of this invention. The glass run 30 differs from the glass run 10 of the first embodiment by employing a plurality of gutters 27 positioned to be slantwise with respect to the longitudinal direction of the bottom portion 22 of the molded part 21', with both ends of each gutter 27 opening into the grooves 26. A gutter 27 can slant at an angle of about 60 degrees with respect to the longitudinal direction of the bottom portion 22. The pitch between centers of adjacent gutters 27 is about 5 mm. Also, each gutter 27 is provided to discharge debris and otherwise has the same cross sectional shape, width and depth as disclosed above for gutters 17.

According to the glass run 30, if debris will be collected on the surfaces of the bottom portions 12, 22, they will be dropped into the gutters 17, 27, and they will move slantwise in the gutters 27 to reach the grooves 26, when the window glass 2 slides on the surfaces of the bottom portions 12, 22. Therefore, the debris is discharged. The gutters 27 for discharging debris can be arranged in sets of one, two or three gutters. Such gutters 27 can have identical cross-sectional shape, cross-sectional area, width, and depth, or alternately, the gutters of any given set can have different cross-sectional shapes, cross-sectional areas, widths, and/or depths from the gutters of an adjacent set. Alternately, the cross-sectional shape, cross-sectional area, width, and depth of the gutters can also be changed every second or third gutter mentioned embodiments, but also encompasses various improvements and modifications may be made as follows without departing from the spirit and scope of the invention. By way of example, and without limitation, such improvements and modifications may include:

(1) Modifying the cross sectional shape, cross sectional area, width and depth of the gutter 27 for discharging debris properly as was mentioned in the above "SUMMARY" section; and (2) Changing the cross sectional shape, cross sectional area, width, and depth of gutters 27 for discharging debris every 1 to 3 gutters.

As many apparently widely different embodiments of this invention may be made without departing from the spirit and scope thereof, it is to be understood that the invention is not limited to the specific embodiments thereof except as set forth in the appended claims.

What is claimed is:

1. A glass run adapted to be attached to a door sash of an automobile to provide a seal between an outer peripheral edge of a raised door window glass and the door sash, said glass run comprising:

at least one extruded part having a channel portion which defined a bottom portion and two side walls, and interior grooves formed in a longitudinal direction on both sides of said bottom portion, wherein said at least one extruded part is adapted to be attached to at least a substantially vertical straight section of said door sash;

at least one extruded gutter for discharging debris being integrally formed on said bottom portion of each of said at least one extruded part, wherein said at least one extruded gutter extends in a longitudinal direction along said bottom portion of said at least one extruded part;

at least one molded part having a channel portion which defined a bottom portion and two side walls, and interior grooves formed in a longitudinal direction on both sides of said bottom portion; and at least one molded gutter for discharging debris being integrally formed on said bottom portion of each of said at least one molded part, wherein said at least one molded gutter extends in a longitudinal direction along said bottom portion of said at least one molded part, wherein each of said at least one extruded part being in operative communication with at least one of said at least one molded part such that said at least one extruded gutter is operatively connected to said at least one molded gutter, and wherein said interior grooves of said extruded part are operatively connected to said interior grooves of said molded part.

2. A glass run as set forth in claim 1, wherein each of said at least one extruded gutter and said at least one molded gutter include from one to five gutters.

3. A glass run as set forth in claim 1, wherein each of said at least one extruded gutter and said at least one molded gutter include at least two gutters with a pitch between centers thereof being about 1 to about 3 mm.

4. A glass run as set forth in claim 1, wherein each gutter of said at least one extruded gutter and said at least one molded gutter has a defined cross sectional shape.

5. A glass run as set forth in claim 1, wherein said at least one molded part is formed from rubber, and each molded gutter has a sufficiently large cross sectional area so that said molded gutter will not be completely filled with mold release agent or process oil contained in said rubber.

6. A glass run as set forth in claim 5, wherein each molded gutter has a cross sectional area of from about 0.15 to about 0.5 mm$^2$.

7. A glass run as set forth in claim 1, wherein each gutter of said at least one extruded gutter and said at least one molded gutter has a width of about 0.4 to about 0.7 mm.

8. A glass run as set forth in claim 1, wherein each gutter of said at least one extruded gutter and said at least one molded gutter has a depth of about 0.4 to about 0.7 mm.

9. A glass run as set forth in claim 1, wherein said at least one extruded part and said at least one molded part are formed from a thermoplastic elastomer.

10. A glass run as set forth in claim 9, wherein each gutter of said at least one extruded gutter and said at least one molded gutter has a width of about 0.4 to about 0.7 mm.

11. A glass run as set forth in claim 9, wherein each gutter of said at least one extruded gutter and said at least one molded gutter has a depth of about 0.4 to about 0.7 mm.

* * * * *